United States Patent [19]

Böttger et al.

[11] Patent Number: 4,931,345

[45] Date of Patent: Jun. 5, 1990

[54] STRUCTURE WITH A MULTIPLY FABRIC REINFORCEMENT AND A METHOD FOR PRODUCING SAME

[75] Inventors: Wolfgang Böttger, Ködnitz; Kurt Biedermann, Kulmbach, both of Fed. Rep. of Germany

[73] Assignee: Vorwerk & Co. Interholding GmbH, Fed. Rep. of Germany

[21] Appl. No.: 219,784

[22] Filed: Jul. 18, 1988

[30] Foreign Application Priority Data

Jul. 17, 1987 [DE] Fed. Rep. of Germany ....... 3723680
Jun. 8, 1988 [DE] Fed. Rep. of Germany ....... 3819440

[51] Int. Cl.$^5$ .............................................. B32B 3/12
[52] U.S. Cl. ................................... 428/116; 264/257; 428/224; 428/226; 428/229; 428/246; 428/257; 428/258; 428/259

[58] Field of Search ............... 428/257, 902, 246, 258, 428/259, 408, 224, 226, 229, 116; 264/257

[56] References Cited

U.S. PATENT DOCUMENTS

| 3,138,506 | 6/1964 | Ross ..................... | 428/116 |
| 3,481,427 | 12/1969 | Dobbs et al. ........... | 428/116 |
| 4,440,819 | 4/1984 | Rosser et al. .......... | 428/257 |

Primary Examiner—James J. Bell
Attorney, Agent, or Firm—Watson, Cole, Grindle & Watson

[57] ABSTRACT

A multiply fabric reinforcement structure includes fabric plies composed of yarns such as aramid fibers, carbon fibers, ceramic fibers or fiberglass, filling weft threads made from a polypropylene or polyamide thread group, and a resin which has been impregnated within the multiply fabric and cured.

26 Claims, 5 Drawing Sheets

STRUCTURE WITH A MULTIPLY FABRIC REINFORCEMENT AND A METHOD FOR PRODUCING SAME

BACKGROUND AND SUMMARY OF THE INVENTION

The invention relates to structures with a multiply fabric reinforcement having filler threads extending between the plies and to a method of producing such structures.

The German utility model 7827000 describes a multiply fabric with a double ply configuration of this type. The space between the plies or layers is either subsequently filled with a foaming material or it is so woven that a system of filler threads is incorporated in the multiply fabric, such filler threads then functioning also as spacer threads. The plies themselves are joined together by binder threads.

The objects of the present invention is to devise a structure of the initially mentioned type on a fabric basis which, while having a high strength, is also low in weight.

According to a principal aspect of the invention, the structure includes at least two fabric plies formed of aramid fibers, carbon fibers, ceramic fibers or fiberglass fibers, filling threads made of polypropylene, polyamide or carbon fibers and which extend in a warp direction between the fabric plies, and a cured resin contained within and between the plies but such that the filling threads have resin-free areas therein.

Owing to this design the invention provides a high-strength, sheet-like structure with a low weight. For products of this type there is naturally a wide range of applications. The high strength achieved by the structure, which is practically to be considered as an organic material having the properties of metal plate, results from the use of technical yarns such as aramide, carbon and ceramic fibers. In particular, a blend of such high performance yarns is conceivable and may be adapted to the respective application.

As regards the filling fiber system, polypropylene or even polyamide is found to be highly satisfactory. In such a case the feature of the low weight is particularly advantageous. The specific gravity is 0.91 g per cc. Added to this the material is very supple. The filaments forming part of a group of threads or sliver occlude the greater part of the cross section of the filling threads to keep out the curing resin material. Only the outer surface part of the material is wetted so that there are still continuous resin-free zones formed by the filling threads (which are pressed together). The latter are incorporated as weft threads.

As regards the fabric structure, there is on the whole a good impregnation with the resin. Furthermore in the case of a structure of component there is the advantage that the multiply fabric reinforcement is made of a technical-quality yarn, more especially fiberglass, and that the filling threads incorporated as weft threads are a group of threads of carbon fiber. This leads to an optimum overall stability and strength, more especially since substantial accumulations of such fiber are possible. Their relatively ropy structure also offers advantageous as regards molding inasfar as the owing to relative shift of the filaments the package of filaments allows satisfactory shaping, it counteracting the tendency to return to the original form which is otherwise to be met with and is due to the friction between the relatively displaced filaments. It is specifically this property which is an advantage for the construction of containers or for instance the fuselage or hull of airplanes and ships. A further advantage in a connection with the best possible impregnation in connection with a "porous" fraction which is nevertheless large is that the filaments of the group of threads of polypropylene or polyamide is irregularly crimped and in the case of a further reduction in the number of filaments this is responsible for a thread group configuration which has an even larger amount of cavity. The fixation of the filling system to the plies forming the multiply fabric is caused by binding threads extending in the warp direction. In this respect there is the further feature that the upper and lower plies are woven using flat fibers. This leads to a thin sheet structure with a plain weave like webbing facing all directions of load with its broad side. There is the further feature of the invention in this connection that the breadth of the flat threads is to be approximately half the breadth of the filling threads.

An advantageous method for the manufacture of a premolding is such that, in order to achieve different thicknesses of the premolding, shims are placed in the mold. Such shims may be in the form of rails in order to create grooves, etc. Members with a more sheet-like form could also be possible, as for instance in order to produce a zone set back from the main surface for the mounting in a protected manner of a label plate with indications of the material used or of the origin, etc. It is an advantage if the shim elements are metallic. Such elements stamped from sheet metal have the advantage of being able to be changed in position. Furthermore they provide a wide range of variation in thickness. In fact, a cushion-like filling thread system makes possible a sufficient displacement in the depth direction even although the rear side is flat. A surprising effect was discovered in this respect inasfar as although the surface structure is rough and fabric-like, where the shims have been placed there is a completely smooth surface (comparable with that produced by rubbing).

If suitably transparent basic material is used, this may in some cases even lead to a form of transparency like glass. This in turn permits the use of the structure as part of photoelectric detecting equipment. A particularly satisfactory combination of materials is furthermore one in which the warp threads of the multiply fabric are fiberglass and the weft threads are carbon fiber. In this respect a good ratio between such materials is one in which the filling threads are present as a multiple of the amount of the warp threads, such multiple being between 5 and 25 times the amount of the warp threads. It is furthermore an advantage if the receiving chamber of the filling threads is formed by the binding structure having the weft threads and the ply structure which here is free of weft threads. This makes possible specially free access for the incorporation of the resin. The multiply fabric may thus have a substantial thickness, that is to say practically 8 or 10 plies. It is furthermore possible for the binding warp threads of the multiply fabric to meander and for the ply warp threads to intersect with the binding warp threads with the formation of the receiving chambers for the filling threads with the result that an extremely stable sandwich configuration is produced, which nevertheless has the necessary degree of elasticity as regards shaping the component.

Lastly in accordance with a further possible feature of the invention the binding warp threads have at least one binding intermediate weft thread between the weft threads of the fabric plies. This leads to a chamber wall, free of any interruptions, in the form of a woven ring. It is furthermore possible for the ply warp threads of the fabric plies to have at least one ply intermediate weft thread between the points of intersection with the binding warp threads. A feature of this type is applicable if large receiving chambers, which are elongated in the warp direction, are to be produced.

The invention will now be described in more detail with reference to working embodiments as shown in the drawings.

DETAILED DESCRIPTION OF THE PREFERRED EMBODIMENTS

Figures 1, 2:
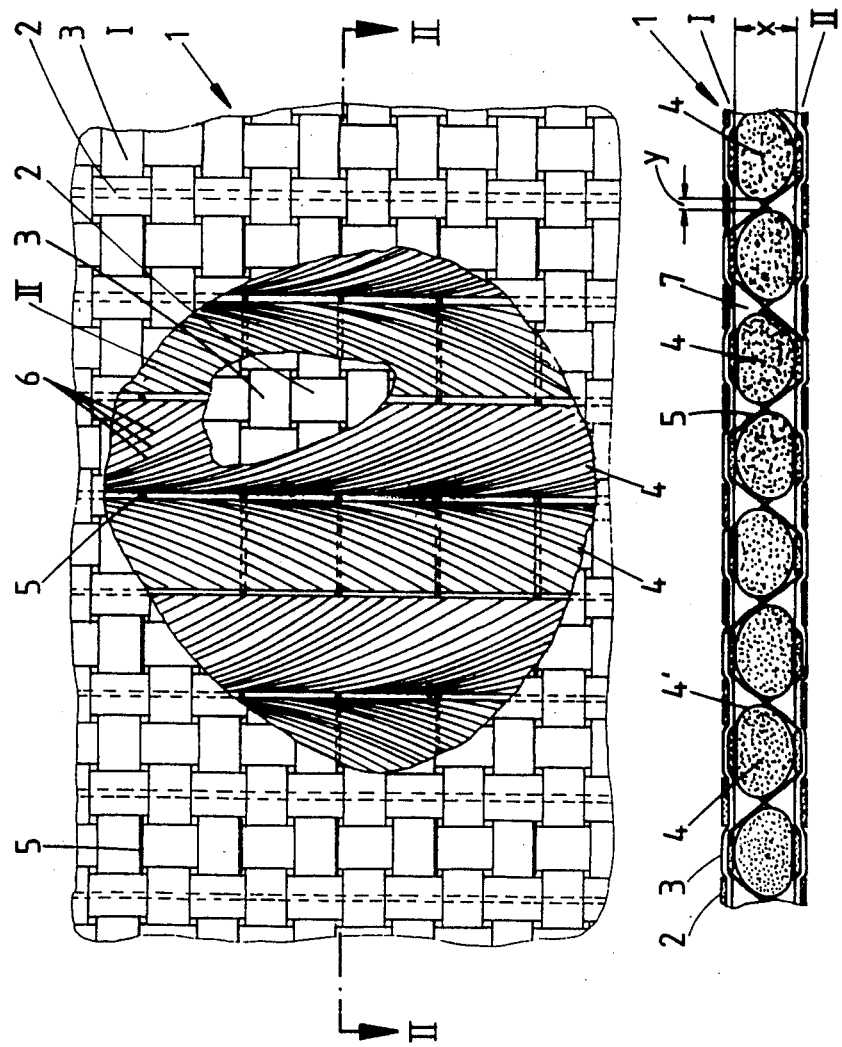
FIG. 1 is a plan view of the sheet-like structure or component partly broken away in order to show the filling system, on an enlarged scale.
FIG. 2 is a section taken on the line II—II of FIG. 1, also on an enlarged scale, to show the dual ply structure.

The structure or component 1 in the form of a multiply fabric will be seen from FIG. 1 to include a first fabric ply or layer I and a second fabric ply II.

The two plies consist of a technical yarn such as aramide fiber, carbon fiber or, more especially, fiberglass. It is also possible to use a mixture of such fibers.

The intersecting weft and warp threads 2 and 3 of the multiply fabric may be slightly twisted. In the drawing they are shown as having a flat form of cross section.

A so-called filling system extends in the space x between the plane-parallel fabric plies I and II. The individual filling threads are referenced 4. They are arranged in the multiply fabric so as to extend in the weft direction and leave a gap y therebetween. However, it would also be possible for the threads to be in contact with each other.

The filling thread 4 supporting and spacing apart the fabric plies I and II is in the form of a group of polypropylene or polyamide fibers in the embodiment of the invention shown in FIGS. 1 and 2. The number of filaments 6 depends more especially on the intended spacing between the plies I and II. The respective overall thread group thickness in cross section is thus dominant (see FIG. 2). The filling system is bound in place during the weaving process by binding threads 5 extending in the warp direction. These threads 5 are alternately trained around the weft threads 2 of the first fabric ply I and the weft threads 2 of the second ply II so that, running through the gap y, they alternately encompass the mutually adjacent filling threads 4. The cross section of the material of the binding threads 5 is distinctly less than that of the weft and warp threads 2 and 3 of the fabric plies I and II.

The filling threads 4 may be slightly twisted as is made to appear in FIG. 1. In order to achieve a favorable transverse spacing of the filaments 6, i.e., to achieve a particularly bulky fiber group configuration, the filaments 6 of the filling threads 4 are irregularly crimped. While having an equally large fiber diameter, the number of filaments 6 is thus reduced to be less than in the case of smooth filaments. Furthermore the overall fabric structure is more supple, which is used in practice for the reinforcement of a component or structure. Such a configuration, when cut to the required length, may thus be rolled up on a cylindrical core and then impregnated with resin which is then cured. The resin plus the curing agent to be added does not penetrate into the parts of the multiply fabric occupied by the filling threads 4. The spaces unoccupied by the filling threads are referenced 7. Furthermore this design means that the fabric plies I and II are embedded. On the other hand the resin only penetrates into the surface part 4' of the filling threads 4 so that a parallel orientated, resin-free filling threads system is left which, owing to the high specific gravity of the resin, nevertheless leads to a structure which all in all is light in weight. The cured resin used for impregnation also fills the gaps or the angular spaces left between the intersecting binding threads bridging over the filling threads 4. The overall result is thus a strong structural member.

For impregnation with curing resin the multiply fabric is placed in a mold and pressed to the desired thickness. Since most of the fraction responsible for making up the thickness is in the form of the filling system, there is a wide range of variation in this respect. The thickness may also be made to undergo partial variation, i.e., vary along the length, by incorporating shims U in the mold which occur on the structure as deepening depressions. Such shims U (marked in FIG. 4 in broken lines) may be metallic elements as for instance metal plates.

Figure 3:
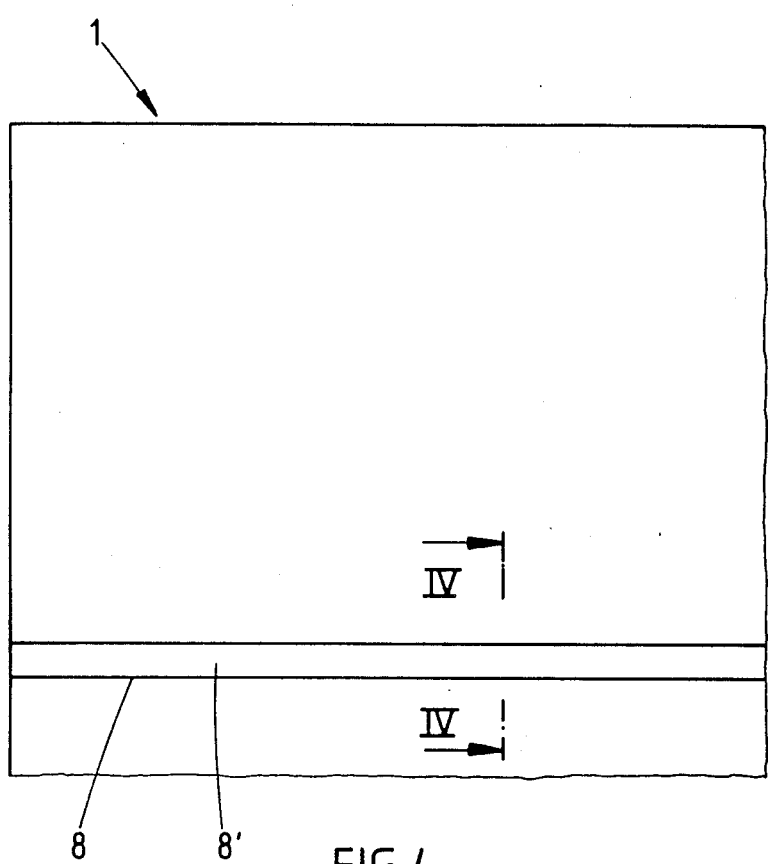
FIG. 3 is a view from below of one part of the structure to make clear a groove-like depression produced by a shim.
Figure 4:
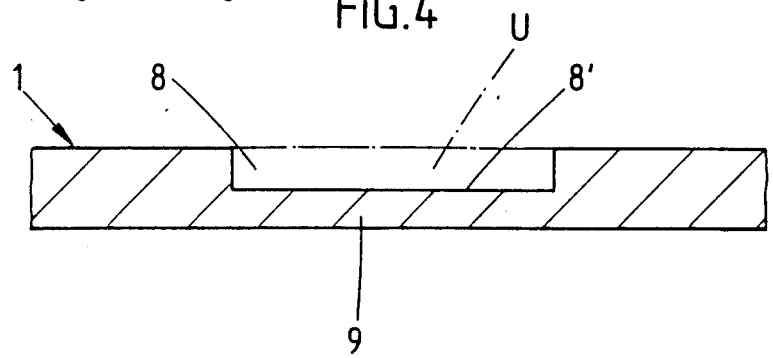
FIG. 4 a section taken on the line IV—IV of FIG. 4 in a diagrammatic form and on a still larger scale.

In the practical application of the invention shown in FIGS. 3 and 4 the structure has been made with a depression 8 in the form of a groove due to the presence of a rail-like shim U. In the underlying compression zone 9 there is then such a high density that the fabric-like configuration of the outer face is practically lost and the depression has completely a flat, plane surface 8' to the depression, this even giving rise to a transparent zone.

As will be seen from FIGS. 1 and 2 the weft threads 2 and warp threads 3 of the first fabric ply I and the second fabric ply II of flat threads are formed by a slightly twisted group of threads. The breadth of the flat threads is approximately equal to half the breadth of the filling threads 4 and to one and a half times the space x between the plies.

The further forms of the invention shown in FIGS. 5 through 8 are such that the multiply fabric also consists of technical yarns. The reference numerals and letters are used in a similar manner so that the four-ply spaced fabric shown in FIG. 5 has plies referenced as I to IV and the ply forming warp threads are referenced 3, while the weft threads crossing them are denoted 2. The filling threads 4 used as weft threads consist of a group of carbon fibers. This smooth ropy material is slightly twisted.

The weft threads 2 of the multiply fabric also consist of carbon fibers so that the proportion of carbon fibers may be increased in this manner. The quantity ratio of filling threads 4 to weft threads 2 is 40K to 3K. Therefore for a given amount of filling threads there is a multiple amount of weft threads 2. A ratio between 5 and 25 times as much has been found to be advantageous.

Figure 5:
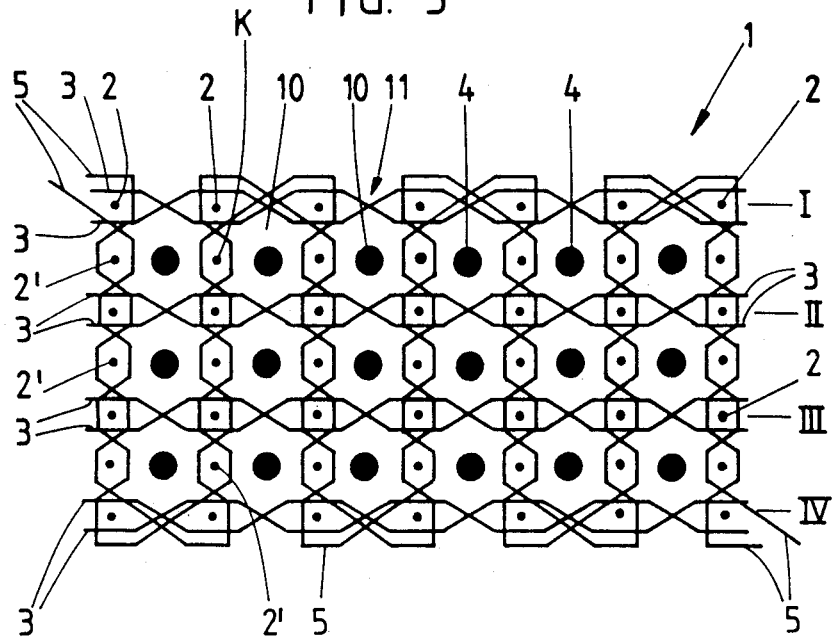
FIG. 5 a substantially diagrammatic weave pattern of a four-ply spaced fabric with a filling weft composed of a group of carbon fibers.
Figure 6:
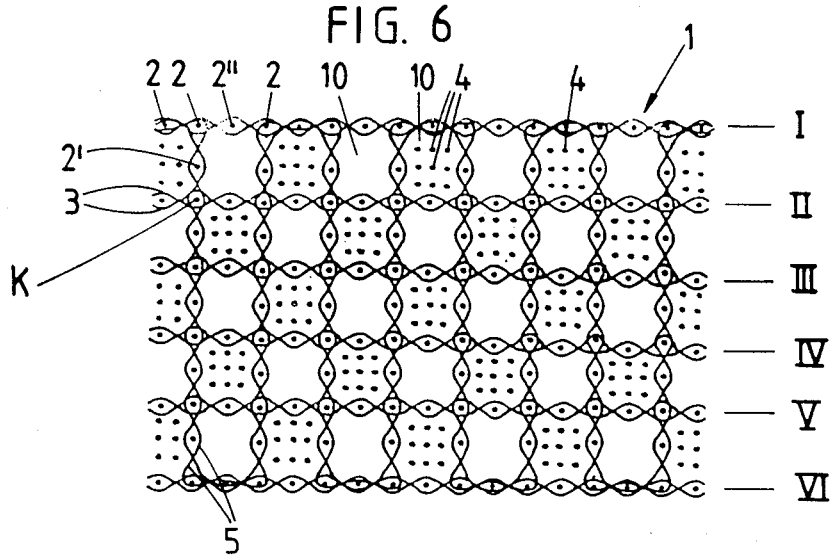
FIG. 6 is a weave diagram of a modified six-ply fabric with a checkered filling weft configuration.
Figure 7:
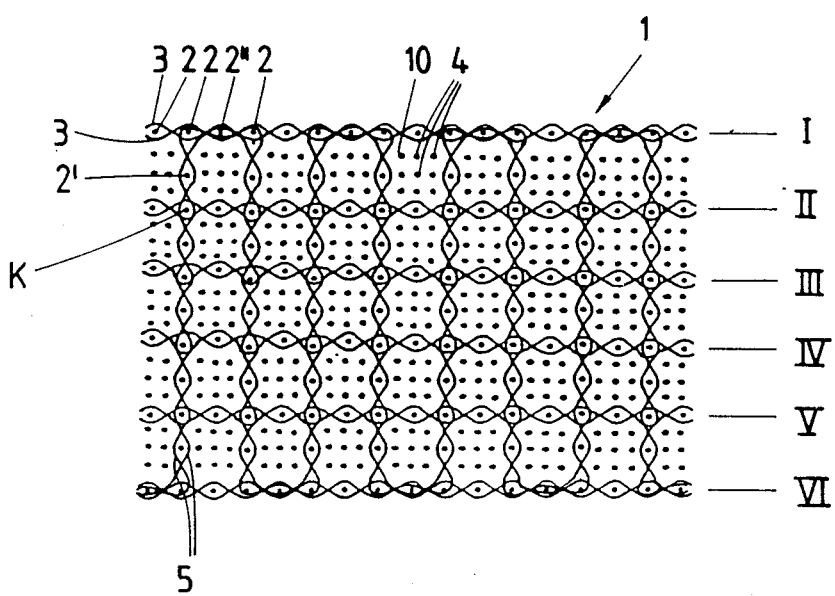
FIG. 7 shows the same fabric after completion of the receiving chambers.

Owing to the very diagrammatic form of the weave pattern the receiving chambers 10 containing the filling threads 4 will be very clearly seen in the FIGS. 5 through 8 of the honeycomb or sandwich multiply fabric. In the design of FIG. 5 the receiving chambers 10 are formed by the binding configuration receiving the weft threads and proportionally by part, which in the present case is free of weft threads, of the ply configuration of the fabric plies I to IV. This feature is preferred since it leads to free entry paths 11 for the impregnating resin. The binding warp threads forming the binding threads are in the present case as well referenced 5. While in the case of the dual ply fabric of FIG. 2 a cross over transition is sufficient as indicated, in the case of the multistoried array of the FIGS. 5 through 8 the binding warp threads are made to meander along a path which in the neighborhood may be oppositely directed or parallel. The plain meandering form is shown in FIG. 5 while the remaining weave diagrams show the oppositely directly type.

As will be seen, the warp threads of the plies I, II and III, etc. of the fabric intersect with the binding warp threads with the formation of the said receiving chambers 10 for the filling threads 4.

As is further indicated, at least one intermediate binding weft thread 2' is inserted between the binding warp threads and between the weft threads 2 of the fabric plies I, II and III, etc.

Figure 8:
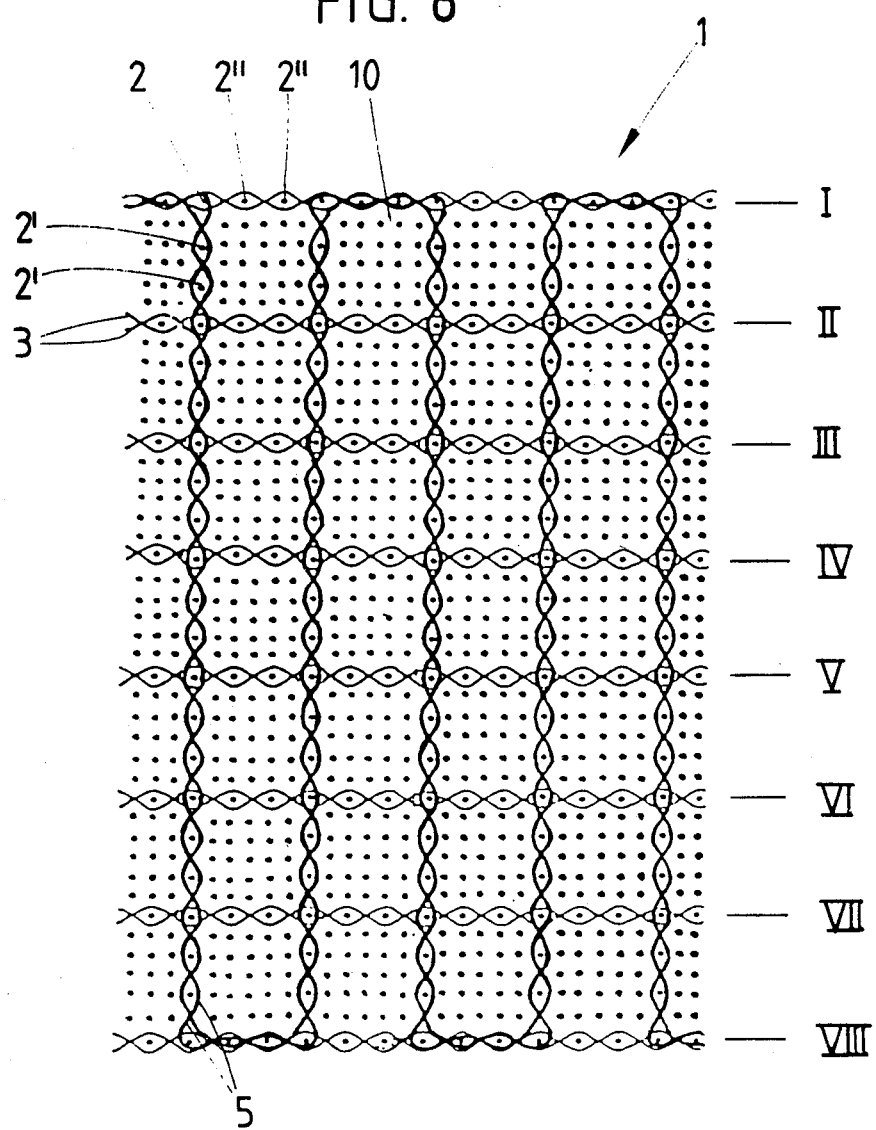
FIG. 8 shows an eight-ply spaced fabric with larger receiving chambers.

The design of FIG. 8 has two such intermediate binding weft threads.

In the case of a weave configuration which is designed to have a larger number of receiving chambers it is appropriate to operate in such a manner that the ply warp threads 3 of the fabric plies I, II and III, etc., have at least one intermediate weft thread 2" between the points K of intersection with the binding warp threads (binding threads 5). In the design of FIG. 8 there are two such intermediate weft threads 2".

It would naturally be possible for the receiving chamber to be elongated in the horizontal direction by modifying the intermediate weft threads 2" and 2'", respectively. Or it is possible to have a vertically orientated elongation.

Furthermore, in certain cases there may only be a partial filling of the receiving chambers 10. This leads to a particularly high degree of deformability in the depth direction, i.e., the thickness direction of the fabric configuration. The design in accordance with FIG. 6 has a filling with an intersecting transition so that overall there is a checkered filling pattern.

In lieu of one carbon thread as a filling thread 4 it is possible for a number of such weft threads to be inserted, same being indicated in the drawing by a number of dots.

As regards the impregnation with resin of the plies of the multiply fabric of FIGS. 5 through 8, the procedure is the same as described above and in such a manner that there is a partial variation in thickness caused by the use of the above-mentioned shims U.

We claim:

1. A structure comprising a multiply fabric that includes plies and filling threads extending between the plies, wherein the multiply fabric is composed of a yarn such as aramid fiber, carbon fiber, ceramic fiber or fiberglass, wherein the filling threads are incorporated in the form of weft threads made from a polypropylene or polyamide thread group, and including a resin which has been impregnated within said multiply fabric and cured.

2. A structure comprising a multiply fabric that includes plies and filling threads extending between the plies, wherein the multiply fabric is composed of a yarn such as aramid fiber, carbon fiber, ceramic fiber or fiberglass, and wherein the filling threads are incorporated in the form of weft threads from a carbon fiber thread group.

3. A structure as claimed in claim 1, wherein filaments of the filling threads are irregularly crimped.

4. A structure as claimed in claim 1, wherein the filling threads are held by binding threads extending in the warp direction.

5. A structure as claimed in claim 1, wherein the upper and lower fabric plies are formed by woven flat threads.

6. A structure as claimed in claim 5, wherein the breadth of the flat threads is equal to approximately half the breadth of the filling threads.

7. A structure as claimed in claim 2, wherein warp threads of the multiply fabric are in the form of fiberglass and the weft threads are in the form of carbon fiber.

8. A structure as claimed in claim 7, wherein the amount of the filling threads exceeds the amount of the warp threads by a factor of between 5 and 25.

9. A structure as claimed in claim 1, wherein the receiving chambers of the multiply fabric for the filling threads are formed by a binding structure having the weft threads and the ply structure free of weft thread.

10. A structure as claimed in claim 1, wherein the binding warp threads of the multiply fabric meander and the ply threads intersect the binding warp threads with the formation of receiving chambers for the filling threads.

11. A structure as claimed in claim 10, wherein the binding warp threads between the weft threads of the fabric plies have at least one intermediate binding weft thread.

12. A structure as claimed in claim 11, wherein the warp threads in the fabric plies have at least one intermediate weft thread between the points of intersection with the binding warp threads.

13. A structural element which is both strong and light in weight and which makes use of a multiply fabric having warp and weft directions, said structural element comprising:
   first and second plies formed of yarns made of fibers selected from the group consisting of aramid fibers, carbon fibers, ceramic fibers and fiberglass fibers,
   filling threads extending between said first and second plies in said warp direction of said fabric, said filling threads being selected from the group consisting of polypropylene threads and polyamide threads, and
   a cured resin within and between said first and second plies except for resin-free areas within the filling threads.

14. A structural element as defined in claim 13, wherein said filling threads are formed of irregularly crimped filaments.

15. A structural element as defined in claim 13, including primary binding threads which extend in said warp direction and interweave said first and second plies and said filling threads.

16. A structural element as defined in claim 15, wherein each of said first and second plies is formed of woven warp and weft threads, and wherein said primary binding threads are woven with said warp threads.

17. A structural element as defined in claim 15, including secondary binding threads between said first and second plies which extend in said weft direction and around which said primary threads are woven.

18. A structural element as defined in claim 15, including at least one intermediate weft thread between the weft threads of each ply which are contacted by said primary threads.

19. A structural element as defined in claim 13, wherein each of said first and second plies is formed of woven flat threads.

20. A structural element as defined in claim 19, wherein said filling threads have first cross-sectional diameters and wherein said flat threads have width dimensions which are about one-half said first cross-sectional diameters.

21. A structural element as defined in claim 13, wherein each of said first and second plies is formed of woven warp and weft threads, and wherein the total number of filling threads exceeds the total number of warp threads by a factor of 5 to 25.

22. A structural element which is both strong and light in weight and which makes use of a multiply fabric having warp and weft directions, said structural element comprising:
first and second plies formed of yarns made of fibers selected from the group consisting of aramid fibers, carbon fibers, ceramic fibers and fiberglass fibers, and
filling threads extending between said first and second plies in said warp direction of said fabric, said filling threads providing gap areas therebetween and being made of carbon fibers.

23. A structural element as defined in claim 22, wherein each of said first and second plies is formed of woven warp and weft threads, wherein said warp threads are made of fiberglass, and wherein said weft threads are made of carbon fibers.

24. A method for the production of a structure which comprises a multiply fabric that includes plies and filling threads extending between the plies, the multiply fabric being composed of a yarn such as aramid fiber, carbon fiber, ceramic fiber or fiberglass, wherein the filling threads are incorporated in the form of weft threads made from polypropylene or polyamide thread group, and including a cured resin impregnated within said multiply fabric, wherein a resin-impregnated multiply fabric is placed in a mold for pressing it and for curing and shims are placed in the mold for ensuring different thicknesses.

25. The method as claimed in claim 24, wherein the shims are in the form of metallic elements.

26. A method of making a structural element which is both strong and light in weight and which has a non-uniform thickness, said method comprising the steps of:
providing a multiply fabric which includes first and second plies formed of yarns and filling threads extending therebetween,
impregnating a curable resin in said first and second plies,
placing said impregnated fabric in a mold having shims therein, and
curing said resin so as to provide said structural element.

* * * * *